United States Patent [19]

Lee

[11] Patent Number: 5,561,893
[45] Date of Patent: Oct. 8, 1996

[54] METHOD OF FORMING A HINGE STRUCTURE

[75] Inventor: Wayman Lee, Santa Clara, Calif.

[73] Assignee: Apple Computer, Inc., Cupertino, Calif.

[21] Appl. No.: 431,419

[22] Filed: May 1, 1995

[51] Int. Cl.⁶ .............................. B23P 11/00; B21D 53/40
[52] U.S. Cl. .................................. 29/434; 29/11; 16/267; 361/796; 361/683
[58] Field of Search ................................ 29/434, 505, 11, 29/243.5, 898.07; 16/254, 259, 378, 267; 312/223.2; 361/683–685, 753, 754, 796, 801

[56] References Cited

U.S. PATENT DOCUMENTS

| | | | |
|---|---|---|---|
| 1,874,732 | 8/1932 | Young | 29/11 X |
| 3,121,946 | 2/1964 | Young | 29/434 |
| 3,360,689 | 12/1967 | Haury | 361/754 |
| 3,803,668 | 4/1974 | Remick | 16/267 X |
| 5,311,643 | 5/1994 | Marquardt et al. | 16/267 |
| 5,438,476 | 8/1995 | Stettes | 312/223.2 X |

FOREIGN PATENT DOCUMENTS

| | | | |
|---|---|---|---|
| 65960 | 5/1950 | Netherlands | 29/11 |

*Primary Examiner*—Peter Vo
*Assistant Examiner*—Khan V. Nguyen
*Attorney, Agent, or Firm*—Burns, Doane, Swecker & Mathis

[57] ABSTRACT

A personal computer includes a metallic main chassis section and a metallic subchassis hinged thereto. The subchassis includes a side wall and a floor forming a corner therebetween. The corner is formed by integral pieces of the subchassis extending between the side wall and floor, the pieces being spaced in a longitudinal direction. The pieces are bent to form first pockets opening transversely to the longitudinal direction. First tabs extend from the side wall in the transverse direction. The main chassis section includes an edge having second tabs spaced longitudinally and bent into U-shaped pockets. To assemble the hinge, the second pockets are inserted into spaces formed between the first pockets and first tabs, so that the first and second pockets become aligned. A hinge pin is inserted into the pockets so as to lie in the longitudinal direction. The first and second tabs are bent around the hinge pin.

9 Claims, 3 Drawing Sheets

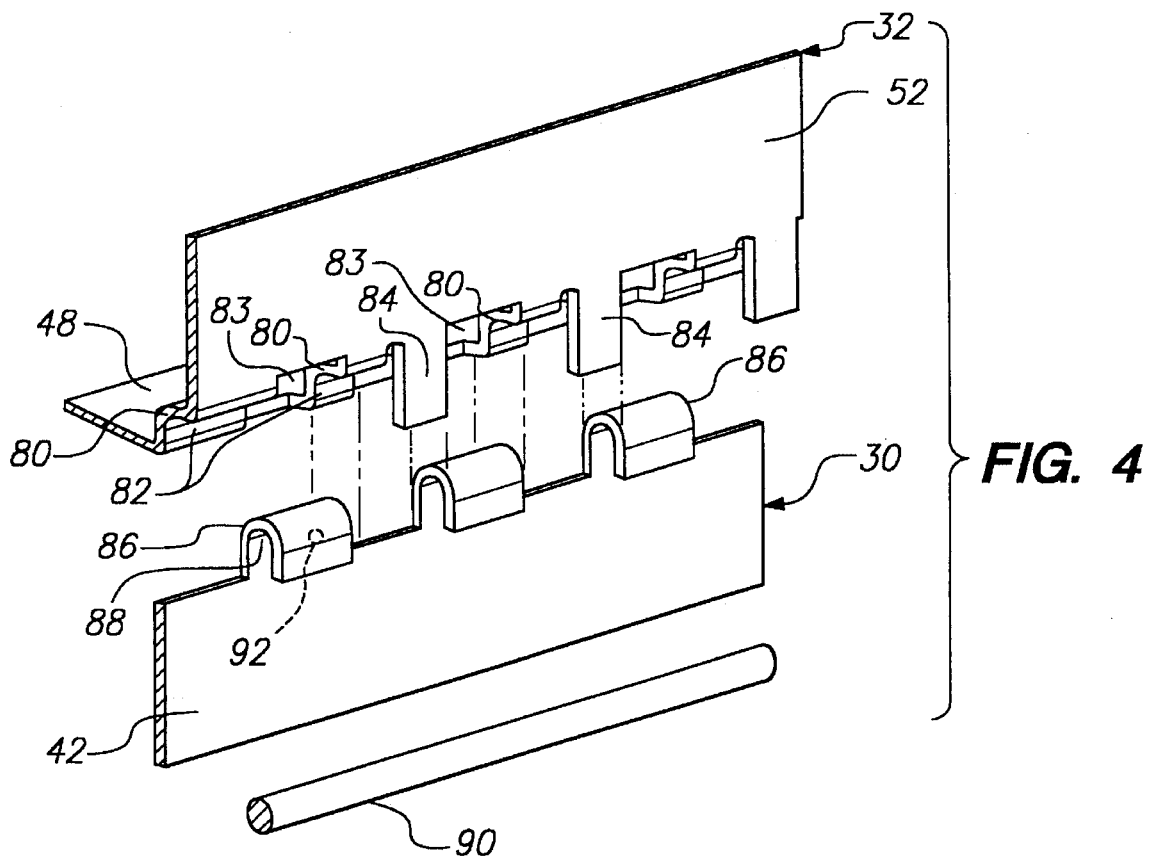
FIG. 4
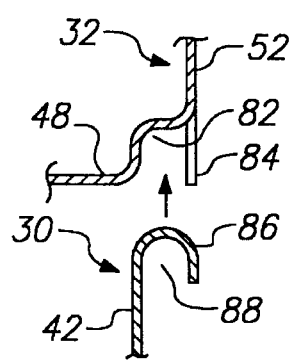
FIG. 5
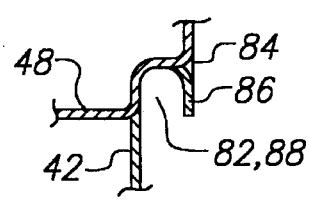
FIG. 6   FIG. 7
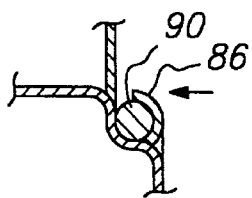
FIG. 8
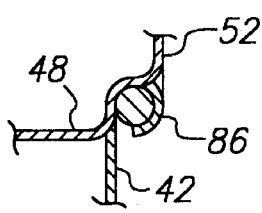
FIG. 9
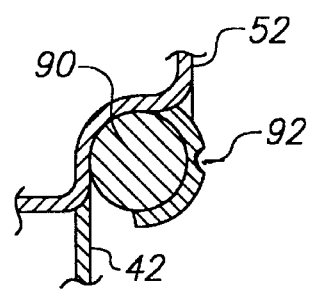
FIG. 10

METHOD OF FORMING A HINGE STRUCTURE

BACKGROUND OF THE INVENTION

The invention relates to personal computers and, in particular, to a chassis or enclosure which houses the electrical operational components of the computer.

A personal computer typically comprises a metallic chassis which houses, and provides electromagnetic interference (EMI) shielding for, certain electrical operational components of a computer, such as a motherboard, power supply disc drive, electric cables, plug-in connectors, cooling fan, etc. An outer housing can also be provided for enclosing the chassis.

The computer is assembled by installing the operational components within the chassis. The components can be fastened to an outer chassis part and/or to subchassis parts which are, in turn, secured within the main part.

Before an assembled computer is delivered to an end user, it may become necessary to modify, i.e., reconfigure, the computer by replacing, removing, and/or adding components. Subsequent to delivery, it may be necessary to service the computer. Such procedures are facilitated by a chassis structure disclosed in concurrently filed application Ser. No. 08/431,417 entitled "Appliance Chassis Having Hingedly Mounted Section" wherein a subchassis is hingedly mounted to a main chassis section for rotation about a horizontal hinge axis. Consequently, the subchassis, and operational components carried thereby, can be swung to a folded-out position to afford access to at least one operational component disposed therebelow in the main chassis section, e.g., a motherboard. The disclosure of that document is incorporated herein by reference.

The operational components of the computer tend to produce electromagnetic waves which, if they escape the confines of the computer, could possibly interfere with nearby electrical equipment, especially communications equipment. Therefore, it is necessary to restrict the escape of the waves in order to keep the emitted decibel level below legally prescribed limits.

In order to resist the escape of electromagnetic waves, an EMI shielding is provided which encloses the operational components. The shielding includes a metal chassis, formed of steel for example, in which the components are encased. Openings formed in the chassis, e.g., required openings for conducting cooling air, are made smaller in size than the wavelength of the electromagnetic waves that are to be confined within the chassis, e.g., smaller than about ¼ inch, in order to resist their escape.

The formation of a hinge structure between the main chassis section and the subchassis, as disclosed in above-mentioned application Ser. No. 08/431,417 should be accomplished in such manner that the size of any openings created between the main chassis section and subchassis are similarly minimized.

Therefore, it would be desirable to provide a method of making a hinge structure which effectively resists the passage of electromagnetic waves.

SUMMARY OF THE INVENTION

The present invention relates to a method of forming a hinge connection between first and second edges of respective first and second metallic members to provide for relative rotation between those members about a longitudinally extending axis. The method comprises providing the first edge of the first member with a plurality of first pockets spaced apart in a longitudinal direction. Each of the first pockets is open in a transverse direction extending transversely of the longitudinal direction. The first edge is provided with first tabs extending in the transverse direction. Each first tab is disposed between adjacent pairs of the first pockets. The second edge of the second member is provided with second tabs which are bent to form generally U-shaped second pockets that are spaced apart in a longitudinal direction. The second pockets are positioned into respective spaces between the first pockets and in longitudinally offset relationship to the first tabs such that the second pockets are open in the same direction as the first pockets and are aligned therewith in the longitudinal direction. A cylindrical hinge pin is inserted into the first and second pockets such that the hinge pin extends in the longitudinal direction. The first and second tabs are then bent around the hinge pin.

Preferably, the first edge of the first member comprises a corner situated between a side wall and a floor of the first member. The floor and the side wall form a right angle therebetween. The corner is in the form of longitudinally spaced strips interconnecting the floor and side wall and deformed to define the first pockets.

Before inserting the hinge pin into the pockets, the pockets are preferably arranged to open upwardly, so that the hinge pin can be inserted downwardly into the pockets.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 4 is a fragmentary perspective view of a first step in the formation of a hinge structure according to the present invention; and FIGS. 5–10 depict steps performed in the forming of the hinge structure according to the invention.

DETAILED DESCRIPTION OF A PREFERRED EMBODIMENT OF THE INVENTION

Figure 1:
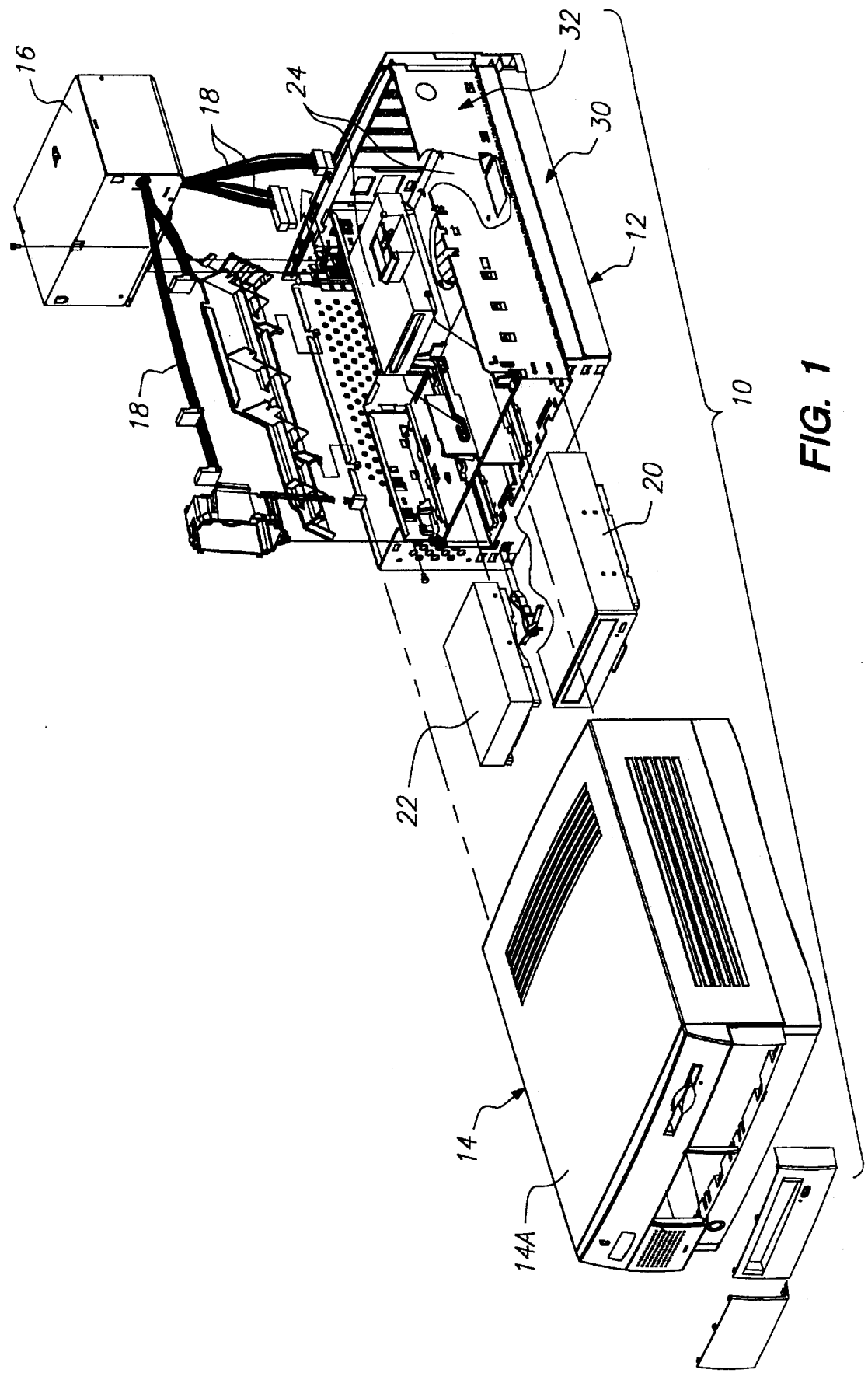
FIG. 1 is an exploded top perspective view of a personal computer according to the present invention.
Figure 2:
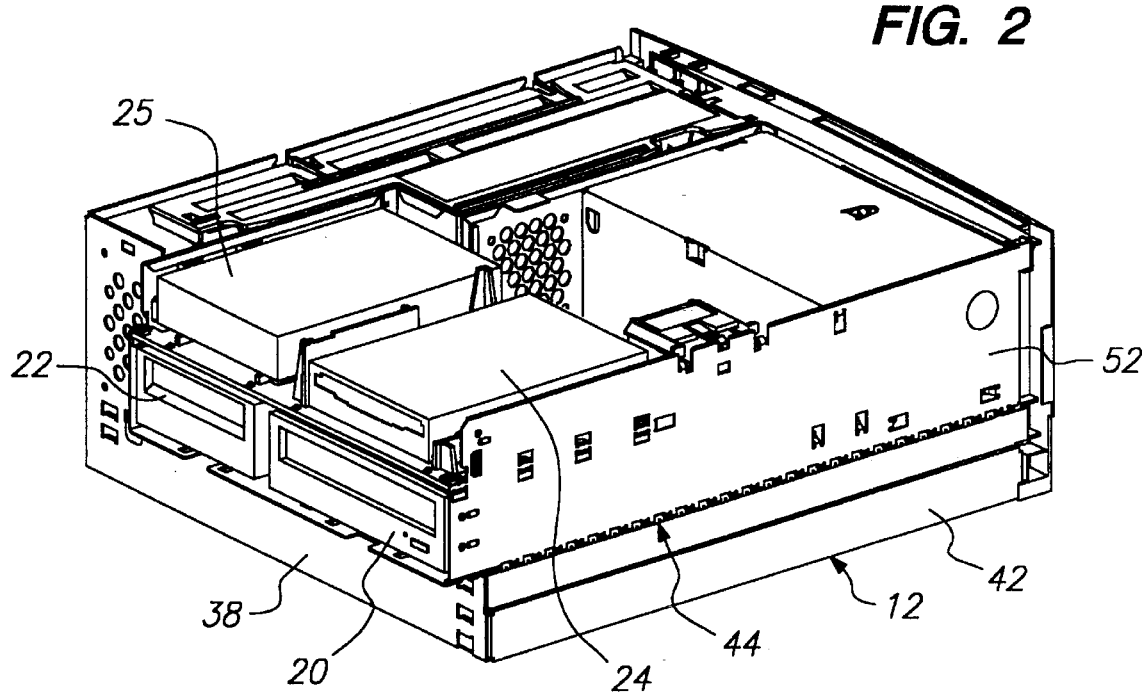
FIG. 2 is a top front perspective view of the chassis depicted in FIG. 1, the chassis including a main chassis portion and a subchassis, the subchassis disposed in a folded-in position.
Figure 3:
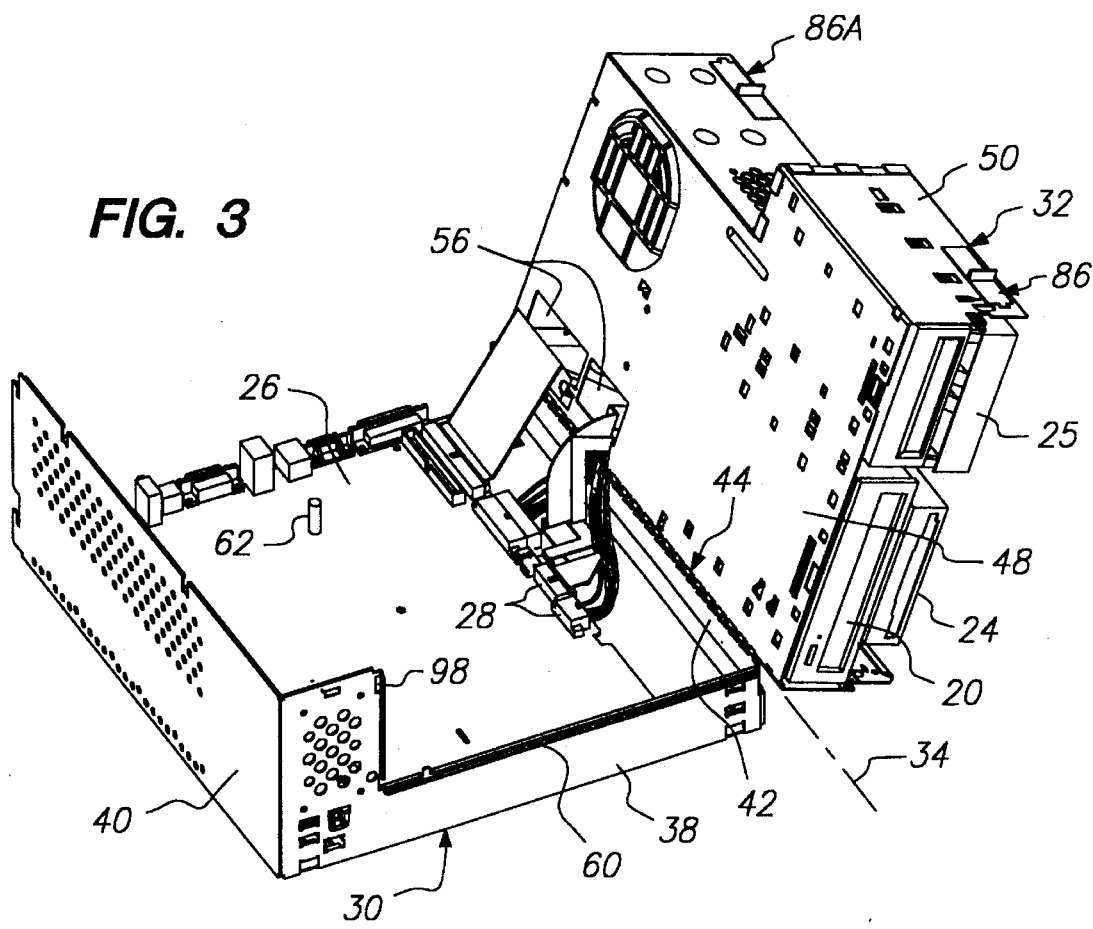
FIG. 3 is a view similar to FIG. 2 with the subchassis in a folded-out position.

Depicted in FIG. 1 is a personal computer 10 comprised of a metal chassis 12 (e.g., steel), an outer housing 14, and operational components including a power supply 16 having electric cables 18, a CD ROM 20, a hard drive 22, and a floppy drive 24 for example. Shown in FIG. 2 is another hard drive 25. Depicted in FIG. 3 is a motherboard 26 carrying connectors 28 to which some of the cables 18 are connected. Other ones of the cables 18 are connected to the operational components 22, 24, 25. A top portion 14A of the outer housing 14 includes, on its underside, a metallic cover (not shown) which overlies the chassis 12 to provide EMI shielding.

The chassis 12 comprises a main or outer section 30, and a subchassis 32 hingedly connected to the main section 30 about a horizontal axis of rotation 34 (see FIG. 3). The subchassis 32 carries bays for mounting the hard and floppy disc drives 22, 24, 25, and the CD ROM 20. The power supply 16 is mounted to the subchassis 32. The motherboard 26 is mounted within a space formed by the main chassis section 30.

The main chassis section 30 includes a bottom wall (not shown), a front wall 38 projecting upwardly from the bottom wall, and two side walls 40, 42 also projecting upwardly from the bottom wall. One of the side walls 42 is shorter than the other side wall 40, and is hinged to the subchassis 32 by a hinge structure 44.

The subchassis 32 includes a floor 48 and a pair of side walls 50, 52 projecting upwardly from the floor 48. One of the side walls 52 is hinged to the side wall 42 of the subchassis to form the axis 34.

Holes 56 are formed in the floor 48 which admit some of the cables 18 interconnecting the power supply 16 with the connectors 28 of the motherboard 26, as shown in FIG. 3.

The subchassis 32 is swingable between a closed or folded-in position shown in FIG. 2, and an open or folded-out position shown in FIG. 3. In the folded-in position a front portion of the floor 48 rests upon horizontal edge surfaces of the main chassis section 30 and upon a post 62 which projects upwardly from the motherboard 26. The subchassis 32 thus overlies the mother board 26 and blocks access thereto. Attention is directed to concurrently filed Ser. No. 08/431,421 entitled "Appliance Having EMI Shielding" for a discussion of the EMI shielding effects created by such a structure. The disclosure of that document is incorporated by reference herein.

It will be appreciated that the computer 10 is assembled by installing the motherboard 26 in the main chassis 30, installing the drives 22, 24, 25 and CD ROM 20 in respective bays of the subchassis 32, installing the power supply 16 in the subchassis, and threading cables 18 through the holes 56 in the floor 48 and connecting those cables to the connectors 26 disposed on the motherboard. Others of the cables 18 are connected to the drives 22, 25 and the CD ROM 20.

In the event that it becomes necessary to reconfigure the thus-assembled computer prior to its being delivered to an end user, e.g., by replacement or reconfiguring of the motherboard, access to the mother board 26 is achieved easily and quickly by simply swinging the subchassis 32 upwardly and outwardly about the axis 34 to the folded-out position (see FIG. 3). That is, it is unnecessary to remove the power supply 16, the drives 22, 24, 25 or the CD ROM 20; rather, those components are simply swung along with the subchassis 32. It is also unnecessary to thread the cables through any holes or disconnect cables in order to unfold the subchassis.

Once the motherboard 26 has been replaced or reconfigured, it is merely necessary to swing the subchassis 32 back to the folded-in position shown in FIG. 2.

As noted earlier, the operational components carried within the main chassis section and the subchassis emit electromagnetic waves which should be confined within the computer to avoid interference with adjacent electrical equipment. To achieve this, it is the practice that any holes formed in the main chassis section and subchassis be minimized in dimension, e.g., be no greater than about ¼ inch.

The presence of the hinge structure 44 also presents a risk of leakage of electromagnetic waves. In accordance with the present invention, however, the hinge structure is formed in a manner which minimizes such leakage.

It will be appreciated that the hinge 44 is formed along (i) an upper edge of the side wall of the main chassis section and (ii) a corner defined by the intersection of the side wall 52 and floor 48 of the subchassis. To fabricate the hinge, the corner is initially formed with strips 80 providing downwardly open pockets 82 spaced apart longitudinally by cut-out regions 83, as shown in FIG. 4. Projecting downwardly from an edge of each cut-out is a tab 84.

The upper edge of the side wall of the main chassis section is provided with longitudinally spaced tabs 86 bent into an arc-shape to form downwardly open pockets 88. The width W of each tab 86 corresponds generally to a distance D between a pocket 82 and tab 84 of the subchassis so that the tabs can be inserted into that space as shown in FIGS. 5 and 6. In that manner, the pockets 82 of the side wall 52 become aligned with the pockets 88 of the side wall 42.

The pockets 82, 88 are sized to receive a cylindrical hinge pin 90 which is inserted therein in a downward direction after the pockets have been inverted as shown in FIG. 7. Thereafter, the tabs 84 and 86 are bent inwardly by a force applied by a suitable tool whereby the tabs encompass the hinge pin, as shown in FIG. 8. The subchassis 32 is then free to rotate about the horizontal axis 34 defined by the hinge pin 90. FIG. 9 depicts the structure shown in FIG. 8 after the latter has been reinverted back to its right-side-up condition to FIGS. 4–6.

Thereafter, a tool can be applied against the tabs 86 to form dimples 92 therein (see FIG. 10). The dimples 92 aid in ensuring that electrical connection occurs between the chassis part 30 and the pin 90, because the formation of the dimples (shown in phantom lines in FIG. 4) causes the material of the tabs to be pushed into contact with the pins.

It will be appreciated that the hinge establishes an EMI shield between the main chassis section 30 and the subchassis 32 by limiting the size of any space or gap therebetween to less than ¼ inch. That is, the tabs 84, 86, together with the pin 90 function to block the space formed between the strips 80, or at least limit the size of those gaps to less than ¼ inch.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed:

1. A method of forming a hinge connection between first and second edges of respective first and second metallic members to provide for relative rotation between said first and second members about a longitudinally extending axis, said method comprising the steps of:

A) providing said first edge of said first member with a plurality of first pockets spaced apart in a longitudinal direction, each of said first pockets being open in a transverse direction extending transversely of said longitudinal direction;

B) providing said first edge with first tabs extending in said transverse direction, each first tab disposed between adjacent pairs of said first pockets;

C) providing said second edge of said second member with second tabs bent to form generally U-shaped second pockets spaced apart in a longitudinal direction;

D) positioning said second pockets into respective spaces between said first pockets, and in longitudinally offset relationship to said first tabs, such that said second pockets are open in the same direction as said first pockets and are aligned therewith in said longitudinal direction;

E) inserting a cylindrical hinge pin into said first and second pockets such that said hinge pin extends in said longitudinal direction; and F) bending said first and second tabs around said hinge pin.

2. The method according to claim 1, wherein said first edge of said first member comprises a corner between a side wall and a floor or said first member, said floor and side wall forming a right angle therebetween, step A comprising forming said corner in the form of longitudinally spaced strips interconnecting said floor and side wall and deformed to define said first pockets.

3. The method according to claim 1, wherein step E comprises arranging said first and second pockets to open upwardly, and inserting said hinge pin downwardly into said pockets.

4. The method according to claim 1, wherein said first and second tabs and said first pockets are arranged so that no space therebetween is greater than one quarter inch.

5. The method according to claim 1 further including providing a dimple in at least some of said tabs to push material of said tabs into contact with said hinge pin.

6. A method of forming a hinge connection between a first chassis member and a second chassis member of a personal computer, said second chassis member including a side wall and a floor intersecting to form a corner defined by strips having spaces formed therebetween in a longitudinal direction, said first chassis member including an edge disposed at said corner, said method comprising the steps of:

A) forming said strips to define first pockets open in a transverse direction extending transversely of said horizontal direction;

B) providing said side wall with first tabs extending in said transverse direction, each first tab disposed between adjacent pairs of said first pockets;

C) providing said edge of said second chassis member with second tabs bent to form generally U-shaped second pockets spaced apart in a longitudinal direction;

D) positioning said second pockets in respective spaces between said first pockets., and in longitudinally offset relationship to said first tabs, such that said second pockets are open in the same direction as said first pockets and are aligned therewith in said longitudinal direction;

E) inserting a cylindrical hinge pin into said first and second pockets such that said hinge pin extends in said longitudinal direction; and F) bending said first and second tabs around said hinge pin.

7. The method according to claim 6, wherein step E comprises arranging said first and second pockets to open upwardly, and inserting said hinge pin downwardly into said pockets.

8. The method according to claim 6, wherein said first and second tabs and said first pockets are arranged so that no space therebetween is greater than one quarter inch.

9. The method according to claim 6 further including providing a dimple in at least some of said tabs to push material of said tabs into contact with said hinge pin.

* * * * *

UNITED STATES PATENT AND TRADEMARK OFFICE
CERTIFICATE OF CORRECTION

PATENT NO. : 5,561,893
DATED : October 8, 1996
INVENTOR(S) : Wayman LEE

It is certified that error appears in the above-indentified patent and that said Letters Patent is hereby corrected as shown below:

Column 6, line 8, after "pockets", delete --.--.

Signed and Sealed this

Fourteenth Day of January, 1997

Attest:

BRUCE LEHMAN

Attesting Officer       Commissioner of Patents and Trademarks